(12) United States Patent
Boren

(10) Patent No.: US 12,486,823 B2
(45) Date of Patent: Dec. 2, 2025

(54) HYBRID BIFURCATING WAVE ENERGY CONVERTER

(71) Applicant: Alliance for Sustainable Energy, LLC, Golden, CO (US)

(72) Inventor: Blake Boren, Superior, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/913,175

(22) Filed: Oct. 11, 2024

(65) Prior Publication Data
US 2025/0122860 A1 Apr. 17, 2025

Related U.S. Application Data

(60) Provisional application No. 63/589,767, filed on Oct. 12, 2023.

(51) Int. Cl.
*F03B 13/14* (2006.01)
*F03B 13/16* (2006.01)

(52) U.S. Cl.
CPC .............. *F03B 13/14* (2013.01); *F03B 13/16* (2013.01)

(58) Field of Classification Search
CPC ........ F03B 13/26; F03B 13/16; F03B 13/188; F03B 13/1885; F03B 13/20; F03B 15/00; F05B 2240/93; F05B 2260/4031; F05B 2220/706; F05B 2240/97; F05B 2280/5001
See application file for complete search history.

(56) References Cited

U.S. PATENT DOCUMENTS

| | | | |
|---|---|---|---|
| 4,095,423 A | 6/1978 | Gorlov | |
| 4,098,081 A | 7/1978 | Woodman | |
| 4,141,670 A | 2/1979 | Russell | |
| 4,210,821 A | 7/1980 | Cockerell | |
| 4,466,244 A | 8/1984 | Wu | |
| 4,622,473 A | 11/1986 | Curry | |
| 6,812,588 B1 | 11/2004 | Zadig | |

(Continued)

FOREIGN PATENT DOCUMENTS

| DE | 202019105749 U1 * | 2/2020 | ............. E02B 3/064 |
|---|---|---|---|
| WO | WO-2021204130 A1 * | 10/2021 | ............. B63B 35/00 |

OTHER PUBLICATIONS

English Translation WO-2021204130-A1 (Year: 2021).*
(Continued)

*Primary Examiner* — Shafiq Mian
(74) *Attorney, Agent, or Firm* — Alexandra M Hall

(57) ABSTRACT

A hybrid bifurcating wave energy converter (WEC) is described. The hybrid bifurcating WEC may be capable operating in various orientations with various degrees of rigidity and/or flexibility. The amount of rigidity or flexibility may be based on the intended mode of operation and the intended operational environment. In some embodiments, the hybrid bifurcating WEC may utilize distributed embedded energy converter technologies and folding, origami-like mechanics. In this way, the overall shape, form, and function of the hybrid bifurcating WEC may be governed by a structure with hinges, bends, and/or joints with the ability to fold and unfold in some embodiments being controlled by the distribution and embedding of many relatively small energy converters (i.e., generators).

13 Claims, 6 Drawing Sheets

(56) References Cited

U.S. PATENT DOCUMENTS

| | | | |
|---|---|---|---|
| 7,525,214 | B2 | 4/2009 | Atilano Medina et al. |
| 7,808,120 | B2 | 10/2010 | Smith |
| 7,830,032 | B1 | 11/2010 | Breen |
| 8,030,789 | B2 | 10/2011 | Ortiz |
| 8,525,364 | B1 | 9/2013 | Costas et al. |
| 8,937,395 | B2 | 1/2015 | Siegel |
| 10,066,595 | B2 | 9/2018 | Thresher et al. |
| 10,546,572 | B2 | 1/2020 | Harne |
| 2004/0007881 | A1* | 1/2004 | Kobashikawa ....... F03B 13/148 290/53 |
| 2008/0164701 | A1 | 7/2008 | Brown et al. |
| 2009/0015014 | A1 | 1/2009 | Devany et al. |
| 2010/0148504 | A1 | 6/2010 | Gerber |
| 2010/0156106 | A1 | 6/2010 | Finnigan |
| 2015/0014996 | A1* | 1/2015 | Siltala ....................... E02B 9/08 307/104 |
| 2020/0397320 | A1 | 12/2020 | Gleich et al. |
| 2021/0054820 | A1* | 2/2021 | Boren .................. F03B 13/182 |
| 2022/0220931 | A1* | 7/2022 | Weng ..................... H02K 1/276 |

OTHER PUBLICATIONS

English Translation DE-202019105749-U1 (Year: 2020).*

Boren, B., "Distributed embedded energy converters for ocean wave energy harvesting: enabling a domain of transformative flexible technologies", European Wave and Tidal Energy Conference, Sep. 2021, 9 pages.

Boren, B., "Prototype and Codesign of Nascent Flexible Wave Energy Converter Concepts", Seedling Showcase, Aug. 2021, 6 pages.

Butler et al., "Highly compressible origami bellows for harsh environments", International Design Engineering Technical Conferences and Computer and Information in Engineering Conference, Nov. 2017, 12 pages.

Guest et al., "The Folding of Triangulated Cylinders, Part II: The Folding Process", Journal of Applied Mechanics, vol. 61, Issue 4, Dec. 1994, pp. 778-783.

Hu et al., "Simulating flexible origami structures by finite element method", International Journal Mechanics and Material Design, vol. 17, Mar. 2021, pp. 801-829.

Li et al., "Uncovering rotational multifunctionalities of coupled Kresling modular structures", Extreme Mechanics Letters, vol. 39, Jun. 2020, 12 pages.

Tao et al., "Origami-inspired electret-based triboelectric generator for biomechanical and ocean wave energy harvesting", Nano Energy, vol. 67, Jan. 2020, 11 pages.

Xu et al., "An origami longitudinal-torsional wave converter", Extreme Mechanics Letters, vol. 51, Feb. 2022, 7 pages.

Zhang et al., "Motion paths and mechanical behavior of origami-inspired tunable structures", Materials Today Communications, vol. 26, Mar. 2021, 8 pag.

Zhen et al., "Uncovering rotational multifunctionalities of coupled Kresling modular structures", Extreme Mechanics Letters, vol. 39, Sep. 2020, 12 pages.

International Search Report and Written Opinion for PCT App. No. PCT/US24/50960, date of mailing Dec. 4, 2024, 11 pages.

* cited by examiner

HYBRID BIFURCATING WAVE ENERGY CONVERTER

CROSS-REFERENCE TO RELATED APPLICATIONS

This application claims priority from U.S. Provisional Patent Application No. 63/589,767 filed on Oct. 12, 2023, the contents of which are incorporated herein by reference in their entirety.

CONTRACTUAL ORIGIN

This invention was made with government support under Contract No. DE-AC36-08GO28308 awarded by the Department of Energy. The government has certain rights in this invention.

BACKGROUND

Most wave energy converters (WECs) are large monolithic rigid bodies limited to a small optimal bandwidth of wave energy conditions. This is because such WECs lack inherent abilities to change their geometry and function. Likewise, most current state-of-the-art WECs are difficult to transport and deploy due to their large sizes. Thus, there remains a need for a WEC capable of operating in various ocean conditions and being easy to install.

SUMMARY

An aspect of the present disclosure is a device including a first panel having a first end, a second panel having a second end, and a hinge connected to the first end and the second end; in which an angle exists between the first panel and the second panel with a vertex at the hinge, a generator is positioned within the hinge, and the generator is capable of converting changes in the angle from an external stimuli to electrical energy. In some embodiments, the angle has a first value and a second value, the second value is less than the first value, the hinge includes a damping device, and the damping device is configured to return the angle to the first value when an external stimuli results in the first panel changing the angle to the second value. In some embodiments, the damping device includes a spring. In some embodiments, the device has a height, the hinge is configured to adjust the angle based on an external stimuli, the hinge is configured to adjust the angle to be substantially acute when the external stimuli exceeds a threshold resulting in the height decreasing. In some embodiments, the threshold includes a force substantially equivalent to a maximum restoring force exerted by the damping device. In some embodiments, the generator includes a brushless generator. In some embodiments, the first panel includes at least one foam, polystyrene, fiberglass, rubber, plastic, wood, polyurethane, or metal. In some embodiments, the first panel includes a fabric, mesh, rubber, or deformable plastic stretched over a substantially solid frame, and the substantially solid frame is configured to hold the fabric, mesh, rubber, or deformable plastic substantially taunt. In some embodiments, the first panel includes a flexible material and an elastomer generator, the first panel is configured to be moved by external stress, and the elastomer generator is capable of converting movement of the first panel to electrical energy. In some embodiments, the flexible material cis a plastic, foam, or rubber. In some embodiments, the elastomer generator is embedded within the flexible material. In some embodiments, a base configured to connect the second panel to a substantially solid material. In some embodiments, the hinge is a first hinge, a second hinge is configured to connect the second panel to the substantially solid material, and an angle exists between the second panel and the substantially solid surface with a vertex at the second hinge, a generator is positioned within the second hinge, and the generator is capable of converting changes in the angle from an external stimuli to electrical energy. In some embodiments, the generator is a brushless generator. In some embodiments, the substantially solid material is at least one of a rock, a coral, a concrete block, an ocean floor, or a dock beam.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

Figure 1A:
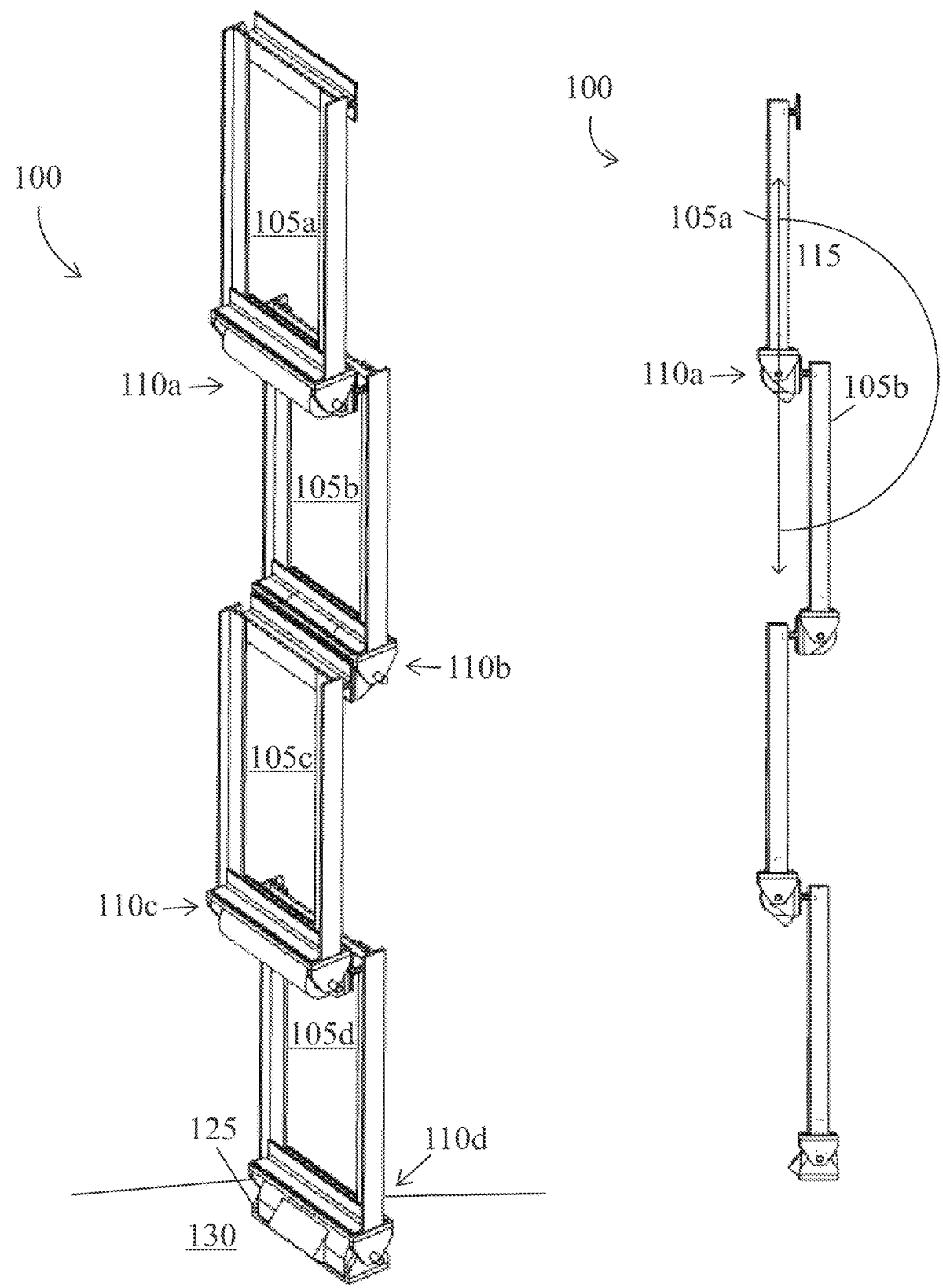
FIGS. 1A-B illustrate an embodiment of a hybrid bifurcating wave energy converter (WEC) in an erect (FIG. 1A) and folded (FIG. 1B) state, according to some aspects of the present disclosure.

REFERENCE NUMERALS 100 hybrid bifurcating wave energy converter (WEC)
105 panel
110 hinge
115 angle
120 generator
125 base
130 solid surface
135 housing
140 spring
145 connection
150 wiring

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to hybrid bifurcating wave energy converters (WEC). The hybrid bifurcating WEC may be capable operating in various orientations with various degrees of rigidity and/or flexibility. The amount of rigidity or flexibility may be based on the intended mode of operation and the intended operational environment. In some embodiments, the hybrid bifurcating WEC may utilize 1) distributed embedded energy converter technologies and 2) folding, origami-like mechanics. In this way, the overall shape, form, and function of the hybrid bifurcating WEC may be governed by an "origami structure" (i.e., a structure with hinges, bends, or joints) with the ability to fold and unfold in some embodiments being controlled by the distribution and embedding of many relatively small energy converters (i.e., generators). These small energy converters may be simple generators that are primarily located and/or near the hinges of the hybrid bifurcating WEC structure. The amount of folding and unfolding (and even where such folding and unfolding occurs) may be determined based on the desired mode of operation and/or intended environment for the hybrid bifurcating ocean WEC.

Figure 1B:
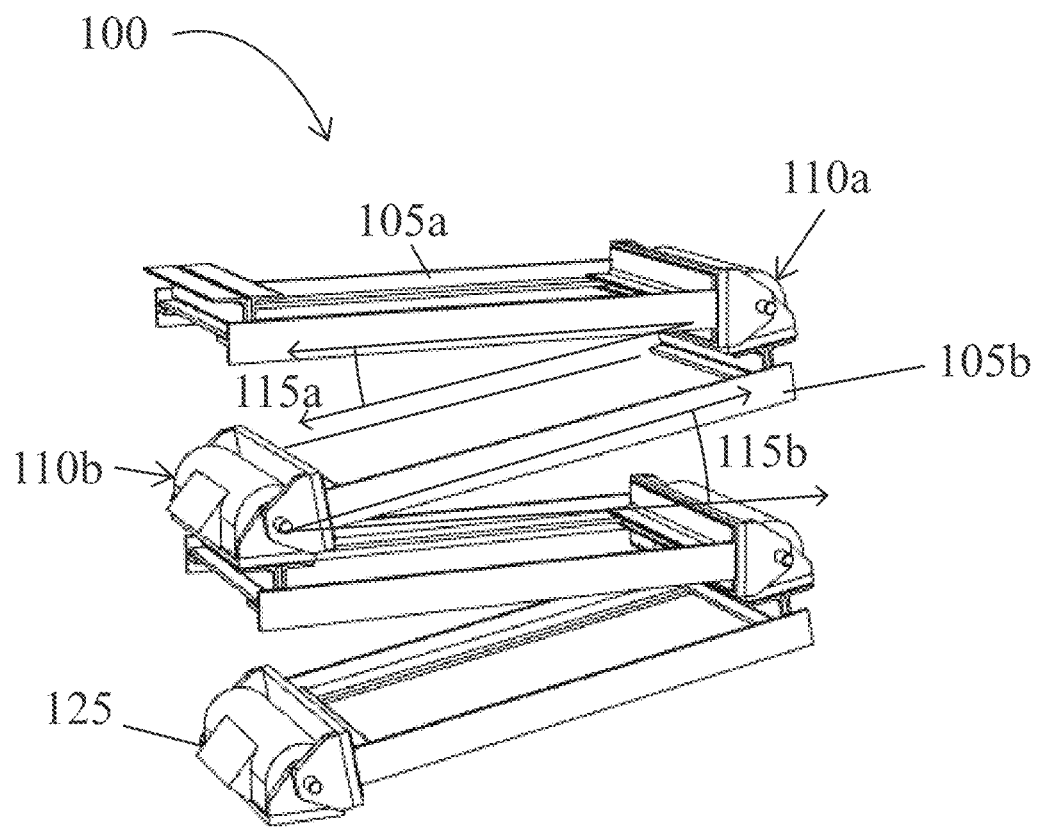
Figure 3A:
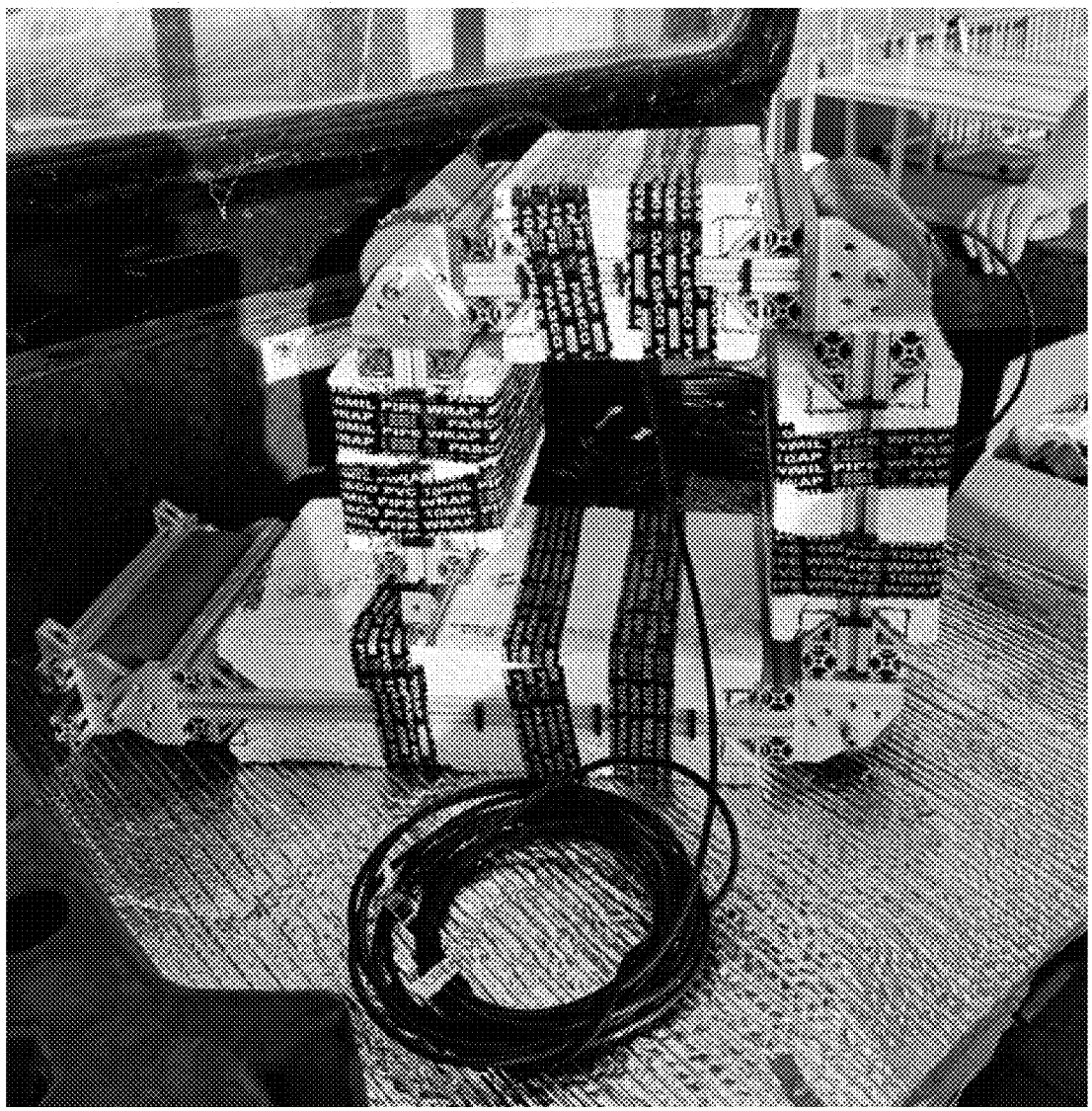
FIGS. 3A-B illustrate photographic views of an embodiment of a hybrid bifurcating WEC, folded (FIG. 3A) and erect (FIG. 3B), according to some aspects of the present disclosure.
Figure 3B:
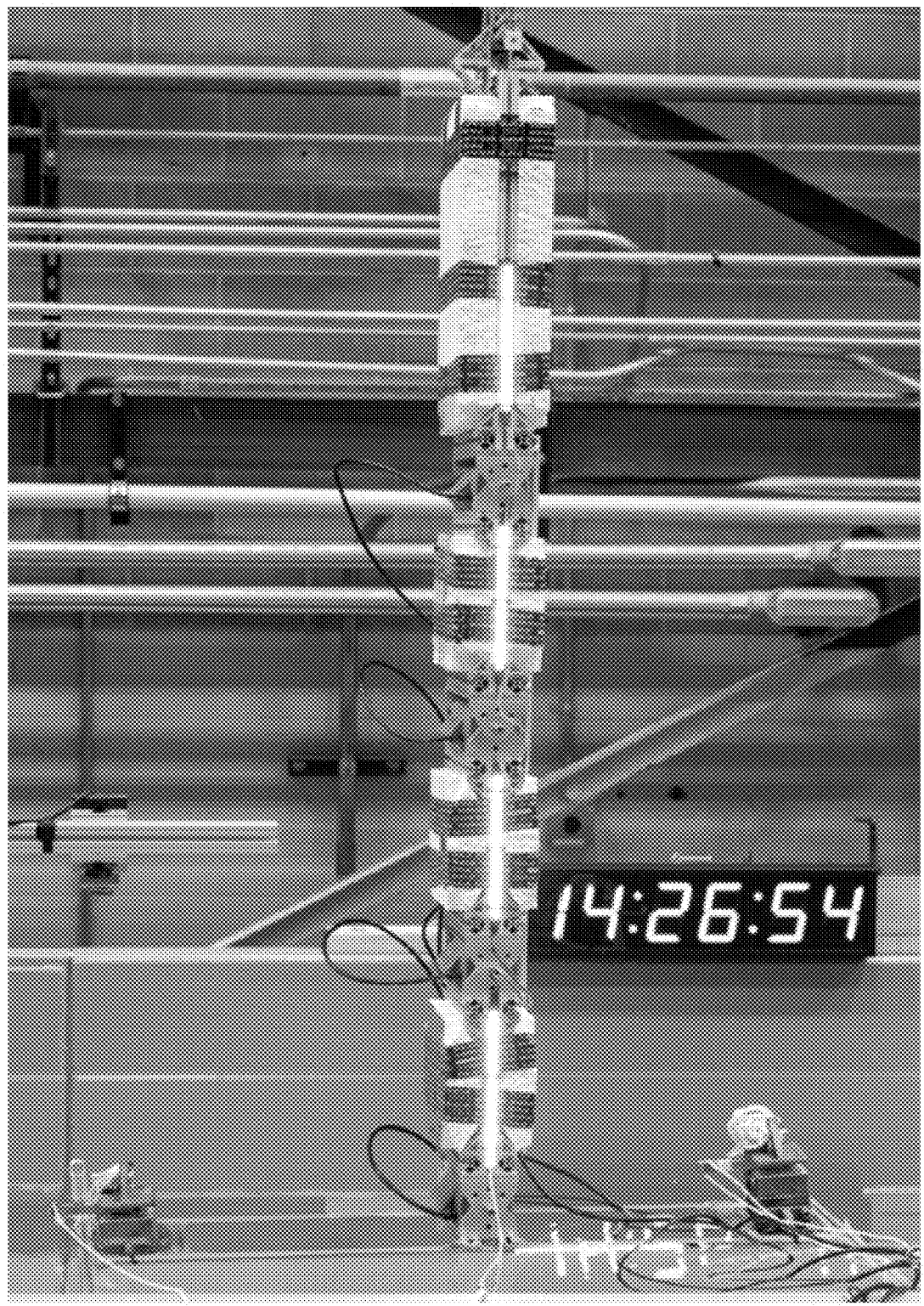

FIGS. 1A-B illustrate a hybrid bifurcating WEC 100 in an erect (FIG. 1A) and folded (FIG. 1B) state, according to some aspects of the present disclosure. FIGS. 3A-B illustrate photographic views of this embodiment of a hybrid bifurcating WEC 100, folded for transport (not deployment as shown in FIG. 1B), (FIG. 3A) and erect (FIG. 3B), according to some aspects of the present disclosure.

The left panel of FIG. 1A shows the erect hybrid bifurcating WEC 100 in an isometric view, while the right panel of FIG. 1A shows the erect hybrid bifurcating WEC 100 in a side view. The hybrid bifurcating WEC 100 includes a plurality of panels 105a, 105b, 105c, and 105d connected via a plurality of hinges 110a, 110b, 110c, and 110d. An angle 115 exists between a first panel 105a and a second panel 105b, with the vertex of the angle 115 located substantially at the hinge 110a connecting the two panels (110a and 110b). A base 125 is connects the hybrid bifurcating WEC 100 to a solid surface 130, such as the ocean floor, a concrete block, reef material (e.g., rock and/or coral), or a dock beam.

Figure 2A:
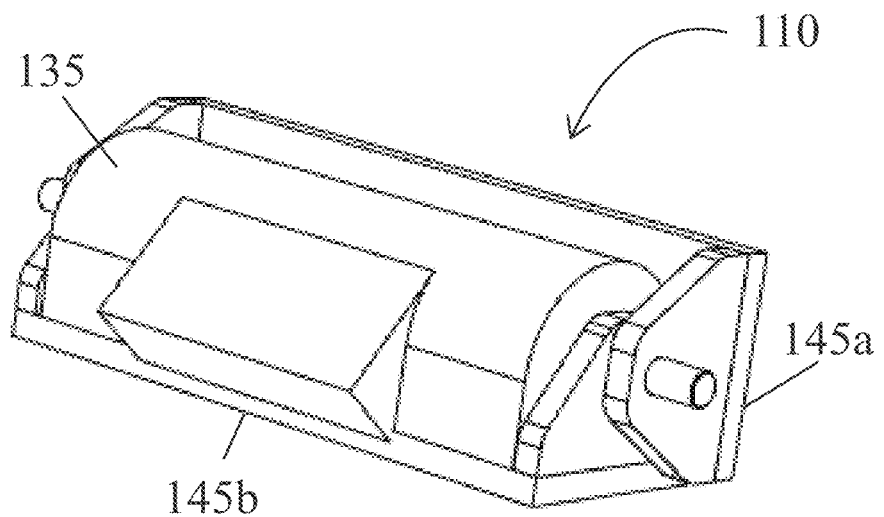
FIGS. 2A-B illustrate an exemplary hinge of an embodiment of a hybrid bifurcating WEC with a housing (FIG. 2A) and the internal components of the hinge (FIG. 2B), according to some aspects of the present disclosure.
Figure 2B:
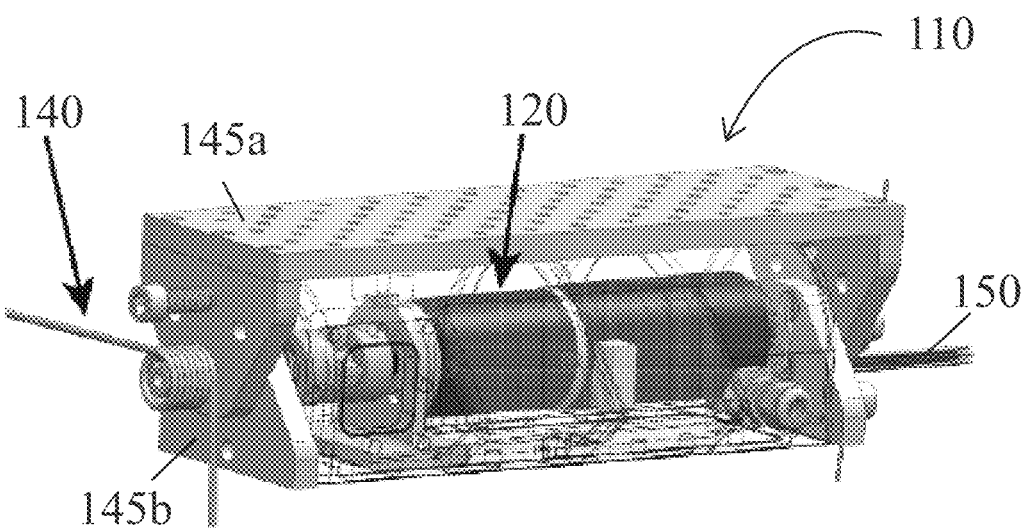

FIGS. 2A-B illustrate an exemplary hinge 110 of the hybrid bifurcating WEC with a housing 135 (FIG. 2A) and the internal components (i.e., the components within the housing 135) of the hinge 110 (FIG. 2B), according to some aspects of the present disclosure. A hinge 110 may include a first connection 145a to a first panel 105a (not shown in FIGS. 2A-B and a second connection 145b to a second panel 105b (not shown in FIGS. 2A-B). The hinge 110 may also include a generator 120 connected to wiring 150. A hinge 110 may also include a spring 140, capable of exerting a restoring force on the first panel 105a and/or the second panel 105b.

In some embodiments, the wiring 150 may be connected to a power conditioning module and/or rectifier (not shown). In some embodiments, a plurality of hybrid bifurcating WECs 100 may be connected via wiring 150 and the electrical energy generated by the plurality of hybrid bifurcating WECs 100 may be connected to such power conditioning module and/or rectifier. In some embodiments, the power conditioning module and/or rectifier may be connected to an energy storage device (not shown) such as a battery.

In some embodiments, the generators 120 and/or the springs 120 in the hinges 110 may substantially dampen or hinder the dynamic deformation (i.e., reduce the magnitude of the changes in the angle 115) of the hybrid bifurcating WEC 100 providing a resistance to the stress and/or force provided by wave action.

In some embodiments, when fully erect, as shown in FIGS. 1A and 3B, the hybrid bifurcating WEC 100 may be substantially flexible, as it is capable of moving (in its entirety or each panel 105 may move substantially independently) in response to wave action. When substantially folded, as shown in FIGS. 1B and 3A, this embodiment of the hybrid bifurcating WEC 100 may be substantially rigid, as the movement of the entire hybrid bifurcating WEC 100 and each individual panel 105 may be substantially limited.

In some embodiments, ocean wave action and/or current may cause the expanding and contracting of an angle 115 of the hybrid bifurcating WEC 100, which may constitute dynamic deformation. This expanding and/or contracting of the angle 115 may be predominantly felt by the hinge 110. For example, in FIG. 1A, the angle 115 is approximately 180°, however, wave action acting on the hybrid bifurcating WEC 100 may cause the first panel 105a and/or the second panel 105b to move in relation to each other, changing the angle 115 to either a substantially obtuse or substantially acute angle. In some embodiments, the wave action may cause the panels 105a and 105b to substantially oscillate between two angles 115, for example, a first angle 115 of approximately 220° and a second angle of approximately 140°. As shown in FIGS. 2B, the hinge 110 may contain a generator 120 capable of converting the kinetic energy from the changes in the angle 115 to electrical energy. Note that with multiple hinges 110 and angles 115, the angles 115 need not be substantially equivalent or congruent.

In some embodiments, at least one generator 120 may be presented in the hinge 110 positioned between a first panel 105a and a second panel 105b. These hinges 110 may act as a pivot or fulcrum between at least two panels 105 and may adjust the angle 115 between the at least two panels 105 (varying in the range of about 0° to about 360)°. As the angle 115 between the two panels 105 is changed based on external stimuli from wave action, the embedded generator 120 may convert the mechanical energy to electrical energy.

In some embodiments, the generator 120 may be an alternator capable of converting the mechanical energy of the panels 105 moving and changing the angle 115 into electrical energy. Exemplary generators 120 include alternating current (AC) generators or direct current (DC) generators. In some embodiments, the generator 120 may be a brushless generator.

FIG. 1B and FIG. 3A illustrate a hybrid bifurcating WEC 100 substantially folded, according to some aspects of the present disclosure. When folded, the angles 115 may be substantially acute (i.e., less than approximately) 90°. Note that in the folded state, the angles 115 and 115b need not be substantially congruent or equivalent.

In some embodiments, the hinges 110 may respond to an external stimuli of extremely strong wave action and/or current changes and cause the hybrid bifurcating WEC 100 to convert from a substantially erect state (as shown in FIGS. 1A and 3B) into a collapsed/folded state. That is, a hinge 110 may "detect" or "feel" force from a wave that exceeds a safety threshold and respond by substantially decreasing the angle 115. The safety threshold may be substantially equivalent to the restoring force the spring 140 is capable of exerting. That is, a hinge 110 may be capable of adjusting the angle 115 to respond to changes in the environment to protect the hybrid bifurcating WEC 100 from wave action too strong for the damping device (i.e., the spring 140) to restore the hybrid bifurcating WEC 100 to its original orientation (i.e., restore the angle 115 to approximately its starting value). This may be a form of physical reservoir computing, as the hybrid bifurcating WEC 100 itself (specifically the hinge 110 and spring 140) is doing the "computation" or determining the appropriate response, simply by having a physical reaction to external stimuli. When in response to an external stimuli greater than the restoring force capable of being exerted by the spring 140, the hinges 110 cause the angle 115 between at least two respective panels 105 decrease and become substantially acute (i.e., less than approximately) 90°, and, in some embodiments, the entire hybrid bifurcating WEC 100 may substantially "collapse" or be in a folded orientation (as shown in FIG. 1B or 3A). In this folded orientation the hybrid bifurcating WEC 100 may be protected from extreme weather or wave action. Further, the hinges 110 may note when the external stimuli (i.e., the wave action) return to a force approximately less than the restoring force capable of being exerted by the spring 140 and increase the angle 115 to return the hybrid bifurcating WEC 100 to its original erect state.

In some embodiments, the hybrid bifurcating WEC 100 may be capable of transforming into a collapsed/folded state as shown in FIG. 1B and FIG. 3A for shipment and deployment (i.e., installation) of the hybrid bifurcating WEC 100. Such ability to bifurcate/transition between substantially erect as shown in FIG. 1A and FIG. 3B and substantially folded as shown in FIG. 1B, make the hybrid bifurcating WEC 100 highly adaptable to many more operational conditions and make it easier for installation and transport than traditional WEC systems.

In some embodiments, the hybrid bifurcating WEC 100 may be made of panels 105, which may have at least a minimal level of stiffness or rigidity. In some embodiments, the panels 105 may be foam, polystyrene, fiberglass, rubber, plastic, wood, polyurethane, metal, or other substantially rigid material. In some embodiments, the panels 105 may be covered with a substantially waterproof sealant and/or a fabric or mesh. In some embodiments, the panels 105 may be a fabric, mesh (i.e., netting) rubber, or deformable plastic stretched over a substantially solid frame which holds the fabric, mesh, rubber, or deformable plastic substantially taunt.

Figure 4:
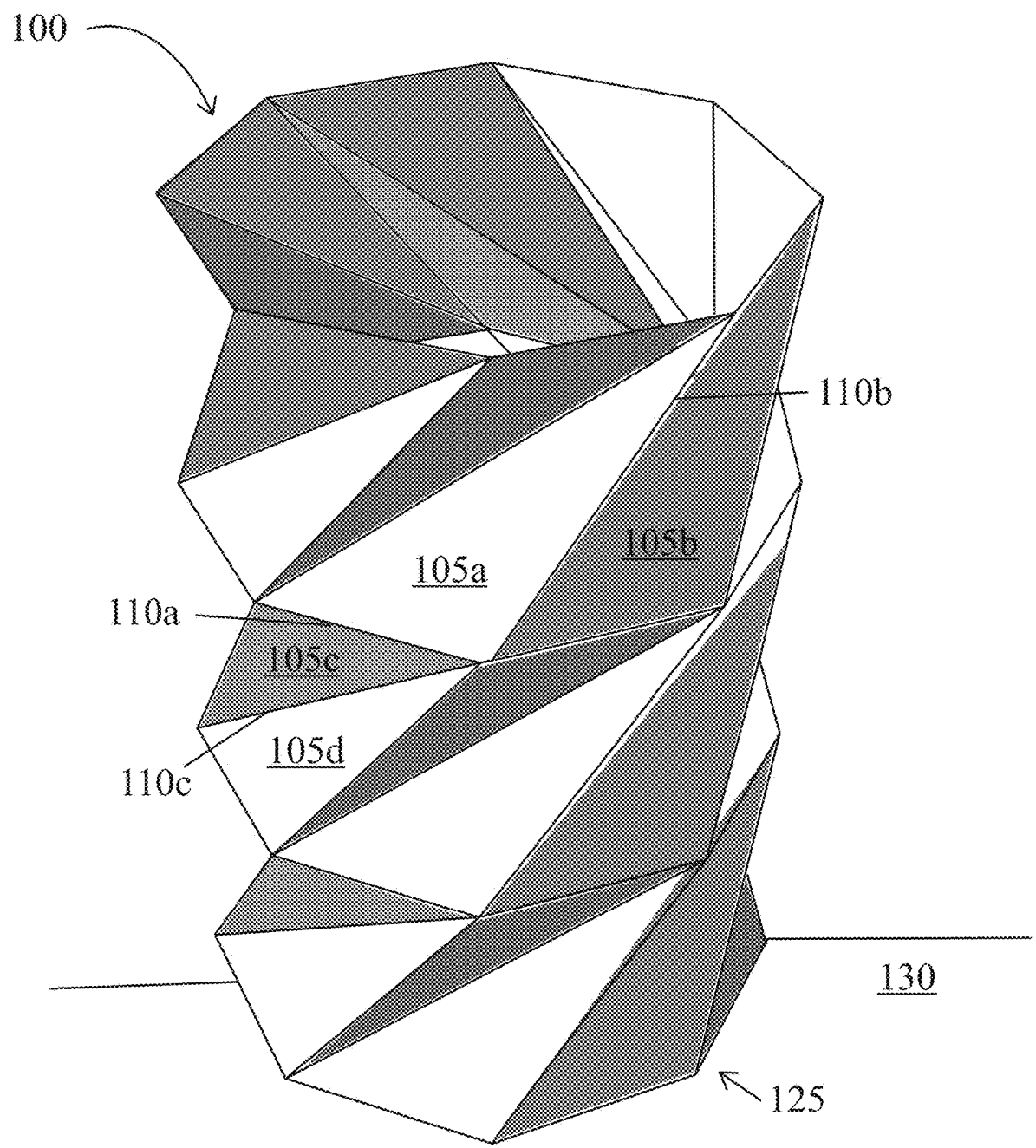
FIG. 4 illustrates a non-generic origami embodiment for a hybrid bifurcating WEC, according to some aspects of the present disclosure.

Note that the example hybrid bifurcating WEC 100 shown in FIGS. 1A-B and FIG. 2 shows four panels 105 and four hinges 110, but in some embodiments, other numbers of panels 105 and hinges 110 may be used. For example, a hybrid bifurcating WEC 100 may contain one, two, three, four, five, six, seven, eight, nine, ten, etc. panels 105 and/or one, two three, four, five, six, seven, eight, nine, ten, etc. hinges 110. In the embodiment shown in FIGS. 1A-B and FIG. 2 has the same number of panels 105 and hinges 110, but in some embodiments, there may be more panels 105 than hinges 110, or, in some embodiments, more hinges 110 than panels 105. For example, in the embodiment shown in FIG. 4, there are at least approximately three hinges 110 per panel 105 in the hybrid bifurcating WEC 100. Further, each panel 105 need not be substantially the same size and/or be made of the same materials. For example, in the embodiment shown in FIG. 4, a plurality of panels 105 are shown, of various shapes, sizes, and orientations. Further, the hybrid bifurcating WEC may have a plurality of hinges 110 and panels 105 arranged in various formations. For example, a single "chain" where the hinges 110 and panels 105 are arranged end to end as shown in FIGS. 1A-B and 3A-B. In this embodiment, the hinges 110 are substantially parallel to each other and the panels 105 are also substantially parallel to each other. In another example, the hinges 110 and panels 105 may be arranged in complex ways to form a cylinder or tube as shown in FIG. 4. In this embodiment, the hinges 110 may intersect each other at a vertex, which may also be considered a hinge 110. That is, an orientation as shown in FIG. 4 allows for a greater number of hinges 110 (and thus generators 120, increasing the amount of electrical energy capable of being generated) than a device arranged as shown in the embodiment in FIGS. 1A-B and 3A-B.

In some embodiments the forces from the wave action may also be felt by the panels 105 which may contain embedded generators 120. In some embodiments, there may be generators 120 (i.e., devices capable of converting mechanical energy to electrical energy) embedded within these panels 105. In some embodiments, the panels 105 may be somewhat elastic, and the generators 120 may be elastomer generators (such as dielectric elastomer generators) capable of being stretched and converting the stretching (a form of mechanical energy) into electrical energy. In some embodiments, the panels 105 may be rubber, plastic, or a water-resistant (or treated to be water-resistant) fabric. Embedding generators 120 within the panels 105 while still including generators 120 in the hinges 110 allows for even more electrical energy to be generated from the wave action.

Note that the hybrid bifurcating WEC 100 may be used in any water source or body of water providing a movement, wave action, or current. Examples of such locations for use of the hybrid bifurcating WEC 100 include in an ocean, sea, river, stream, lake, pond, or reservoir. The water may be substantially salt or fresh water. The hybrid bifurcating WEC 100 may be substantially submerged during use but may be capable of operating at a variety of depths of water (e.g., substantially shallow water, deep water, open ocean, etc.).

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device comprising:
a first panel having a first end;
a second panel having a second end; and
a hinge connected to the first end and the second end and comprising a damping device; wherein:
an angle exists between the first panel and the second panel with a vertex at the hinge, a generator is positioned within the hinge,
the angle has a first value and a second value,
the second value is less than the first value,
the damping device configured to return the angle to the first value when an external stimuli results in the first panel changing the angle to the second value, and
the generator is capable of converting changes in the angle from an external stimuli to electrical energy.

2. The device of claim 1, wherein:
the damping device comprises a spring.

3. The device of claim 1, wherein:
the device has a height,
the hinge is configured to adjust the angle based on an external stimuli,
the hinge is configured to adjust the angle to be substantially acute when the external stimuli exceeds a threshold resulting in the height decreasing.

4. The device of claim 3, wherein:
the threshold comprises a force substantially equivalent to a maximum restoring force exerted by the damping device.

5. The device of claim 1, wherein:
the generator comprises a brushless generator.

6. The device of claim 1, wherein:
the first panel comprises at least one of a foam, polystyrene, fiberglass, rubber, plastic, wood, polyurethane, or metal.

7. The device of claim 1, wherein:
the first panel comprises a fabric, mesh, rubber, or deformable plastic stretched over a substantially solid frame, and
the substantially solid frame is configured to hold the fabric, mesh, rubber, or deformable plastic substantially taunt.

8. The device of claim 1, wherein:
the first panel comprises a flexible material and an elastomer generator,
the first panel is configured to be moved by an external stress, and
the elastomer generator is capable of converting movement of the first panel to electrical energy.

9. The device of claim 8, wherein:
the flexible material comprises a plastic, a foam, or a rubber.

10. The device of claim 8, wherein:
the elastomer generator is embedded within the flexible material.

11. A device comprising:
a first panel having a first end;
a second panel having a second end;
a first hinge connected to the first end and the second end; and
a second hinge connected to the second end and a substantially solid material, wherein: a second generator is positioned within the second hinge,
a first angle exists between the first panel and the second panel with a vertex at the hinge,
a first generator is positioned within the first hinge,
a second angle exists between the second panel and the substantially solid surface with a vertex at the second hinge,
the first generator is capable of converting changes in the first angle from an external stimuli to electrical energy and
the second generator is capable of converting changes in the second angle from the external stimuli to electrical energy.

12. The device of claim 11, wherein:
the generator comprises a brushless generator.

13. The device of claim 11, wherein:
the substantially solid material comprises at least one of a rock, a coral, a concrete block, an ocean floor, or a dock beam.

* * * * *